United States Patent
Patel et al.

(10) Patent No.: US 7,764,950 B2
(45) Date of Patent: Jul. 27, 2010

(54) ADVANCED VOICE SERVICES ARCHITECTURE FRAMEWORK

(75) Inventors: Krishnakant M. Patel, Dallas, TX (US); Vyankatesh V. Shanbhag, Plano, TX (US); Ravi Ayyasamy, Richardson, TX (US); Stephen R. Horton, Princeton, TX (US); Shan-Jen Chiou, Plano, TX (US)

(73) Assignee: Kodiak Networks, Inc., San Ramon, CA (US)

( * ) Notice: Subject to any disclaimer, the term of this patent is extended or adjusted under 35 U.S.C. 154(b) by 1427 days.

(21) Appl. No.: 11/134,883

(22) Filed: May 23, 2005

(65) Prior Publication Data
US 2005/0254464 A1   Nov. 17, 2005

Related U.S. Application Data

(63) Continuation-in-part of application No. 10/515,556, filed as application No. PCT/US03/16386 on May 23, (Continued)

(60) Provisional application No. 60/573,059, filed on May 21, 2004, provisional application No. 60/576,092, filed on Jun. 2, 2004, provisional application No. 60/382,981, filed on May 24, 2002, provisional application No. 60/383,179, filed on May 24, 2002, provisional application No. 60/407,168, filed on Aug. 30, 2002, provisional application No. 60/488,638, filed on Jul. 18, 2003, provisional application No. 60/492,650, filed on Aug. 5, 2003, provisional application No. 60/576,094, filed on Jun. 2, 2004, provisional application No. 60/569,953, filed on May 11, 2004, provisional application No. 60/579,309, filed on Jun. 14, 2004, provisional application No. 60/571,075, filed on May 14, 2004.

(51) Int. Cl.
H04M 3/42   (2006.01)

(52) U.S. Cl. .................. 455/414.1; 455/412.2
(58) Field of Classification Search ................ 455/518, 455/3.05, 426.1, 435.1, 407, 412.2, 414.1, 455/414.3, 466
See application file for complete search history.

(56) References Cited

U.S. PATENT DOCUMENTS 5,711,011 A   1/1998   Urs et al.

(Continued)

FOREIGN PATENT DOCUMENTS

WO   WO 00/79825   12/2000

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.

(Continued)

Primary Examiner—Tu X Nguyen
(74) Attorney, Agent, or Firm—Gates & Cooper LLP

(57) ABSTRACT

Advanced voice services, such as Push-to-Talk (P2T), Push-to-Conference (P2C), Upgrade to Conference (upgrade from P2T to P2C), Push-to-Message (P2M) and group SMS (Short Message Service), are provided for wireless networks. These services are provided by an architectural framework that interfaces into the wireless network in order to provide group call setup and messaging. Handset pre-provisioning reduces customer interaction in the process of activating handsets for use in the network. Presence messages are communicated between handsets and a real-time exchange using the Short Message Service (SMS), but without having to transmit the messages through a Short Message Service Center (SMSC) gateway, but instead the messages are transmitted using Mobile Application Part (MAP) interface connecting the real-time exchange directly to a mobile switching center.

14 Claims, 5 Drawing Sheets

Related U.S. Application Data 2003, application No. 11/134,883, which is a continuation-in-part of application No. PCT/US2004/023038, filed on Jul. 16, 2004, which is a continuation-in-part of application No. PCT/US03/16386, application No. 11/134,883, which is a continuation-in-part of application No. 11/126,587, filed on May 11, 2005, which is a continuation-in-part of application No. 10/515,556, filed on Nov. 23, 2004, and a continuation-in-part of application No. PCT/US2004/023038, application No. 11/134,883, which is a continuation-in-part of application No. 11/129,268, filed on May 13, 2005, now Pat. No. 7,403,775, which is a continuation-in-part of application No. 10/515,556, and a continuation-in-part of application No. PCT/US2004/023038.

(56) References Cited

U.S. PATENT DOCUMENTS

| | | | |
|---|---|---|---|
| 5,987,318 | A | 11/1999 | Alperovich et al. |
| 6,021,326 | A | 2/2000 | Nguyen |
| 6,138,011 | A | 10/2000 | Sanders, III et al. |
| 6,304,558 | B1 | 10/2001 | Mysore |
| 6,411,815 | B1 | 6/2002 | Balasuriya |
| 6,477,366 | B1 | 11/2002 | Valentine et al. |
| 6,577,874 | B1 * | 6/2003 | Dailey ................. 455/521 |
| 6,661,878 | B1 | 12/2003 | Mirashrafi et al. |
| 6,996,414 | B2 * | 2/2006 | Vishwanathan et al. ..... 455/518 |
| 2001/0005372 | A1 | 6/2001 | Cave et al. |
| 2002/0196781 | A1 | 12/2002 | Salovuori |
| 2003/0016632 | A1 | 1/2003 | Refai et al. |
| 2003/0078064 | A1 | 4/2003 | Chan |
| 2003/0148779 | A1 * | 8/2003 | Aravamudan et al. ....... 455/519 |
| 2003/0190888 | A1 | 10/2003 | Mangal et al. |
| 2004/0057449 | A1 | 3/2004 | Black |
| 2004/0259580 | A1 | 12/2004 | Florkey et al. |
| 2005/0202807 | A1 | 9/2005 | Ayyasamy et al. |
| 2005/0221819 | A1 | 10/2005 | Patel et al. |
| 2005/0239485 | A1 | 10/2005 | Kundu et al. |
| 2005/0254464 | A1 | 11/2005 | Patel et al. |
| 2005/0261016 | A1 | 11/2005 | Patel et al. |
| 2006/0019654 | A1 | 1/2006 | Farrill |
| 2006/0030347 | A1 | 2/2006 | Biswas |
| 2006/0189337 | A1 | 8/2006 | Farrill et al. |
| 2006/0234687 | A1 | 10/2006 | Patel et al. |
| 2007/0037597 | A1 | 2/2007 | Biswas et al. |
| 2007/0037598 | A1 | 2/2007 | Ayyasamy et al. |

FOREIGN PATENT DOCUMENTS

| | | |
|---|---|---|
| WO | WO2005009006 | 12/2000 |
| WO | WO 03/101007 | 12/2003 |
| WO | WO2005112494 | 11/2005 |
| WO | WO2005115032 | 12/2005 |
| WO | WO2005117474 | 12/2005 |
| WO | WO2006105287 | 10/2006 |

OTHER PUBLICATIONS

Nokia: "What is TETRA? Why Nokia TETRA?", The Nokia TETRA Primer, 2002, pp. 1-29. XP002345778 http://www.nokia.com/downloads/solutions/government/SD114EN_gov.pdf.

Skype: "Skype". Web Archive—Skype, May 22, 2004, pp. 1-2. XP002345780 http://web.archive.org/web/20040522201727 http://www.skype.com.

Trachwell: "TrackWell Software and Tetra Iceland deliver value added services to Tetra users", Trackwell.com, Oct. 2002, pp. 1-1. XP002345781 http://www.trackwell.com/news/news_twandtetra.htm.

* cited by examiner

ADVANCED VOICE SERVICES ARCHITECTURE FRAMEWORK

CROSS REFERENCE TO RELATED APPLICATIONS

This application claims the benefit under 35 U.S.C. Section 119(e) of the following and commonly-assigned U.S. provisional patent applications:

U.S. Provisional Patent Application Ser. No. 60/573,059, filed May 21, 2004, by Krishnakant Patel, Ravi Ayyasamy and Vyankatesh V. Shanbhag, entitled "SMSC BYPASS (SB) FOR EXPEDITED PRESENCE MESSAGING,"

U.S. Provisional Patent Application Ser. No. 60/576,092, filed Jun. 2, 2004, by Krishnakant Patel, Stephen R. Horton, Vyankatesh V. Shanbhag and Shan-Jen Chiou, entitled "PRE-PROVISIONING FOR P2T OVER THE AIR ACTIVATION,"

both of which applications are incorporated by reference herein.

This application is a continuation-in-part and claims the benefit under 35 U.S.C. Sections 119, 120 and/or 365 of the following and commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," which application claims the benefit under 35 U.S.C. Section 365 of PCT International Patent Application Ser. No. PCT/US03/16386 filed May 23, 2003, which application claims the benefit under 35 U.S.C. Section 119(e) of U.S. Provisional Patent Application Ser. Nos. 60/382,981, filed May 24, 2002, 60/383,179, filed May 24, 2002 and 60/407,168, Aug. 30, 2002;

PCT International Patent Application Number PCT/US04/23038, filed Jul. 16, 2004, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 119(e) of U.S. Provisional Patent Application Ser. Nos. 60/488,638, filed Jul. 18, 2003, 60/492,650 , filed Aug. 5, 2003 and 60/576,094, filed Jun. 2, 2004 and which application is a continuation-in-part and claims the benefit under 35 U.S.C. Section 119, 120 and/or 365 of PCT International Patent Application Ser. No. PCT/US03/16386, filed May 23, 2003;

U.S. patent application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," which application claims the benefit under 35 U.S.C. Section 119(e) of U.S. Provisional Patent Application Ser. Nos. 60/569,953, May 11, 2004 and 60/579,309, Jun. 14, 2004, and which application is a continuation-in-part and claims the benefit under 35 U.S.C. Sections 119, 120 and/or 365 of U.S. Utility patent application Ser. No. 10/515,556 and PCT International Patent Application Ser. No. PCT/US04/23038; and U.S. patent application Ser. No. 11/129,268, filed May 13, 2005 now U.S. Pat. No. 7,403,775, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," which application claims the benefit under 35 U.S.C. Section 119(e) of U.S. Provisional Patent Application Ser. No. 60/571,075, filed May 14, 2004, and which application is a continuation-in-part and claims the benefit under 35 U.S.C. Sections 119, 120 and/or 365 of U.S. Utility patent application Ser. No. 10/515,556 and PCT International Patent Application Ser. No. PCT/US04/23038; all of which applications are incorporated by reference herein.

BACKGROUND OF THE INVENTION

1. Field of the Invention

This invention relates in general to wireless communications systems and more specifically, to an advanced voice services architecture framework for wireless communications systems.

2. Description of Related Art

Group-based voice services, such as two-way half-duplex voice calls within a group or between individuals, also known as "Push-to-Talk," "Press-to-Talk," PTT or P2T, have enormous revenue earnings potential for wireless networks, such as cellular networks and personal communications systems (PCS) networks. Corporate subscribers primarily use such services for coordinating field people or fleet users from a central location.

Currently, there are three major approaches employed in providing group-based voice services such as P2T in wireless networks. One approach requires the installation of a dedicated private network, parallel to the wireless network, to support the group-based voice services. NEXTEL uses such a system, based on a solution developed by MOTOROLA known as IDEN. However, a dedicated private network is costly to install and maintain and is employed by a few public wireless carriers. Also, the IDEN system is non-standard and hence cannot be used in standard wireless communications networks, such as those based on CDMA and GSM.

Another approach is based on Voice over IP (VoIP) technologies. While this approach promises compliance with newer and emerging standards, such as GPRS (General Packet Radio Service), UMTS (Universal Mobile Telecommunications System), etc., it does not provide a solution for carriers employing wireless networks based on existing standards, such as GSM (Global System for Mobile Communications), CDMA (Code Division Multiple Access), etc. However, even for the newer standards, solutions based on VoIP have serious drawbacks, including slower call setup, significant overhead, increased susceptibility to packet losses, low bit rate voice coders and significant modifications to the mobile handset. There is a need, instead, for solutions that require only minimal upgrades to the handset.

Still another approach is that defined in co-pending and commonly-assigned patent applications identified above and incorporated by reference herein. In this approach, group-based voice services are provided by a dispatch gateway or real-time exchange that interfaces to the wireless network to provide the group-based voice services therein, wherein both the dispatch gateway or real-time exchange and handsets that use the group-based voice services communicate with each other using call setup and in-band signaling within the wireless network.

Notwithstanding these innovations, there is a need in the art for advanced voice services that comply with existing and emerging wireless standards and provide superior user experiences. The present invention aims to satisfy this need by

SUMMARY OF THE INVENTION

To overcome the limitations in the prior art described above and to overcome other limitations that will become apparent upon reading and understanding the present specification, the present invention discloses an implementation for advanced voice services (AVS) that are provided for wireless networks. These services are provided by an architectural framework that interfaces into the wireless network in order to provide group call setup and messaging. Handset pre-provisioning reduces customer interaction in the process of activating handsets for use in the network. Presence messages are communicated between handsets and a real-time exchange using the Short Message Service (SMS), but without having to transmit the messages through a Short Message Service Center (SMSC) gateway, but instead the messages are transmitted using Mobile Application Part (MAP) interface connecting the real-time exchange directly to a mobile switching center.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof and in which is shown by way of illustration the specific embodiment in which the invention may be practiced. It is to be understood that other embodiments may be utilized as structural changes may be made without departing from the scope of the present invention.

Overview

The present invention provides for advanced voice services (AVS), such as Push-to-Talk (P2T), Push-to-Conference (P2C), Upgrade to Conference (upgrade from P2T to P2C), Push-to-Message (P2M) and group SMS (Short Message Service), for wireless networks. These services are provided by an architectural framework that interfaces into the wireless network in order to provide call setup and messaging.

Network Architecture

Figure 1:
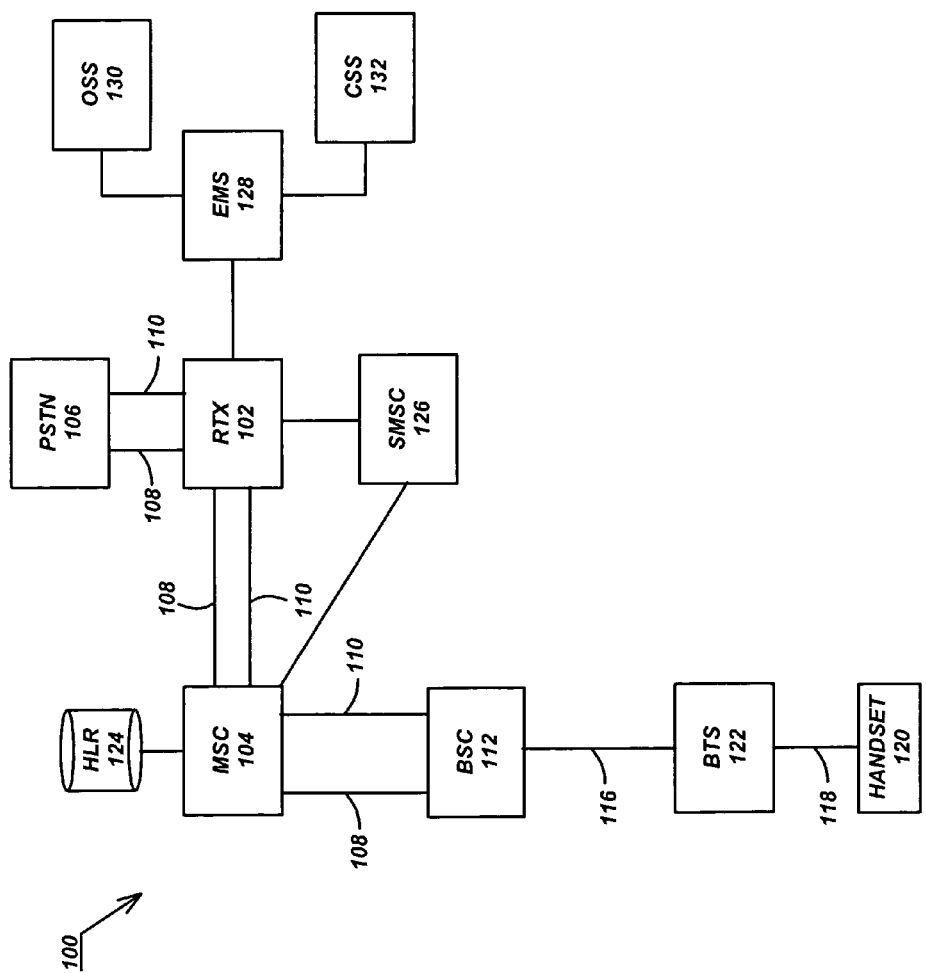
FIG. 1 is a block diagram that illustrates an exemplary embodiment of a wireless communications network according to a preferred embodiment of the present invention.

FIG. 1 is a block diagram that illustrates an exemplary embodiment of a wireless communications network according to a preferred embodiment of the present invention.

Within the network 100, an RTX (Real-Time Exchange) 102, previously known as a Dispatch Gateway (DG), communicates with a MSC (Mobile Switching Center) 104 and PSTN (Public Switched Telephone Network) 106 using SS7-ISUP/WIN/CAMEL (Signaling System 7—Integrated Services Digital Network User Part/Wireless Intelligent Network/Customized Applications for Mobile Enhanced Logic) messages at a signaling plane 108. A bearer path 110 implements a TDM (Time Division Multiplexing) interface carrying PCM (Pulse Code Modulation) or TFO (Tandem Free Operation) voice frames.

When a subscriber originates an AVS call, the MSC 104 routes the call to the RTX 102. The MSC 104 also requests the BSC 112 via 116 to establish a radio traffic path 118 with the handset 120 via the BTS (Base Transceiver Station) 122 (as it does for a normal cellular call). At this time, the BSC 112 tries to negotiate TFO (if it is supported) or PCM on a TDM link with the far end (in this case, the RTX 102).

At the same time (after the MSC 104 terminates the AVS call request to the RTX 102), the RTX 102 identifies the terminating users and their MS-ISDN (Mobile Station—Integrated Services Digital Network) numbers. It sends an ISUP call origination request for each terminating handset 120. It may send requests directly to the MSC 104, PSTN 106 or other terminating network, depending on the routing table configuration for terminating MS-ISDN numbers. Once the bearer path 110 is established, the RTX 102 begins a negotiation with the far end (e.g., the terminating BSC 112) for each terminating leg to a handset 120.

Once bearer paths 110 are established for originating and terminating legs for an AVS call, the RTX 102 switches (or duplicates) voice frames between the originating handsets 120 and terminating handsets 120.

The RTX 102 may use various other networks, such as an IP network or the Internet/Intranet, for various other purposes. For example, these networks may be used in a toll bypass mode where two RTXs 102 can exchange voice traffic bypassing the PSTN 106. In another example, these networks may be used for registration and presence applications.

Since the MSC 104 will not direct a registration request from a handset 120 to the RTX 102 (because it would require changes in the MSC 104), the latter does not have any information of the registered handsets 120. To circumvent this issue, a registration and presence application executes in the handset 120 and registers with the RTX 102, after establishing a communication path with the RTX 102. The RTX 102 also uses this path to update the presence information in group members' handsets 120 with the network 100 availability of the handsets 120 of other members of the group.

During roaming, a Home Location Register (HLR) 124 can be accessed via the MSC 104. The HLR 124 can be used to track the presence of group members' handsets 120 within the network 100 and updates the group members' handsets 120 with the network 100 availability of the handsets 120 of other members of the group.

In one embodiment, the SMS (Short Message Service) transport is used to carry presence messages between the RTX 102 and the handsets 120. Presence messages are communicated between the handset 120 and a SMSC (Short Message Service Center) gateway 126 and between the SMSC gateway 126 and the RTX 102. However, the SMSC gateway 126 may be bypassed, as described in more detail below.

Finally, three systems are used by the wireless network 100 operator to manage the wireless network 100, including an Element Management System (EMS) 128 that maintains network 100 and handset 120 profiles, settings and parameters, an Operational Support System (OSS) 130 that provides operational and maintenance support for subscribers of the wireless network 100 and a Customer Support System (CSS) 132 that provides customer support for the wireless network 100. These systems 128, 130 and 132 work together to manage the wireless network 100 and handsets 120, as described in more detail below.

Real Time Exchange

Figure 2:
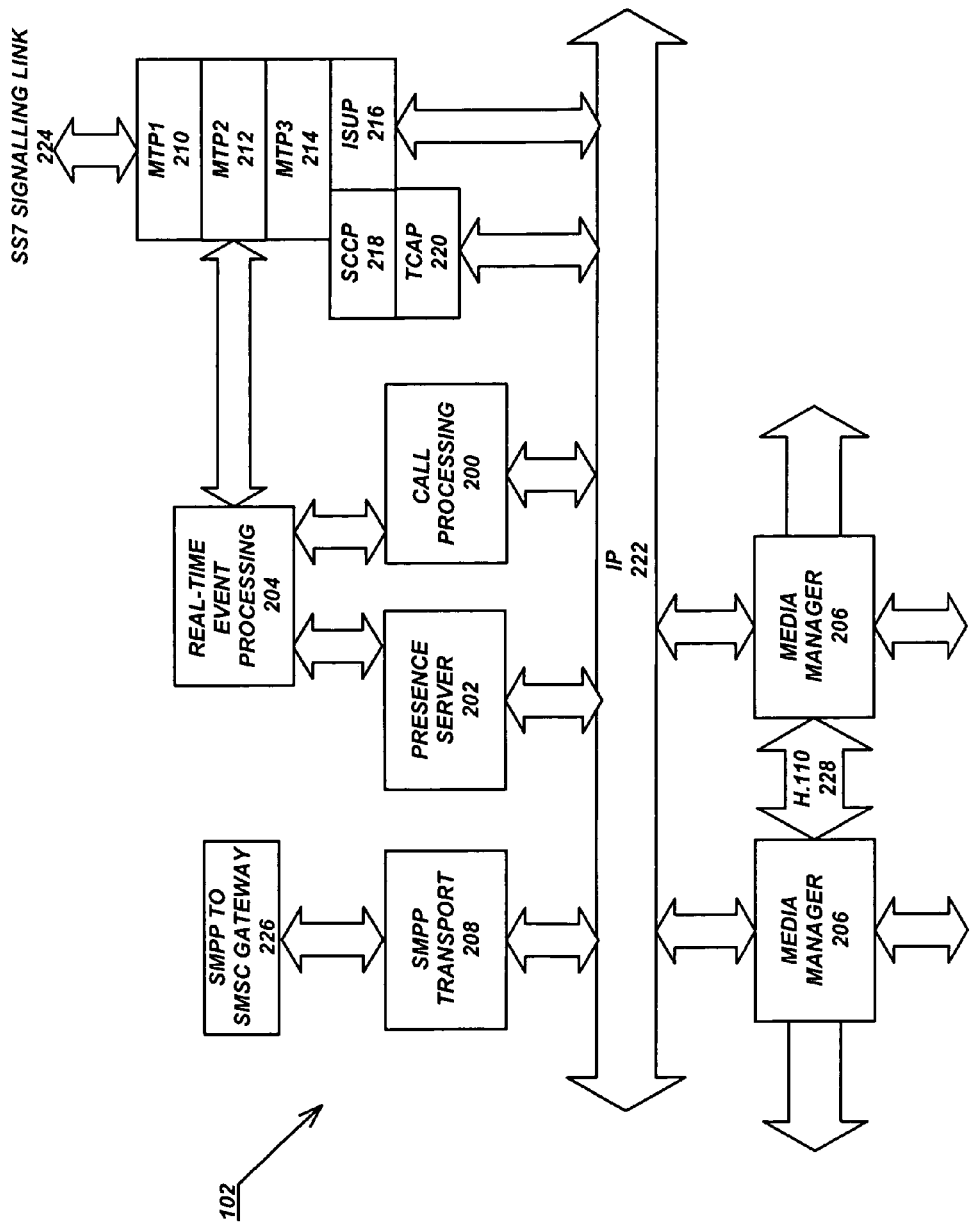
FIG. 2 illustrates a proposed architecture for a real-time exchange (RTX) according to the preferred embodiment of the present invention.

FIG. 2 illustrates a proposed architecture for the RTX 102 according to the preferred embodiment of the present invention.

The architecture includes a Call Processing system 200, Presence Server 202, Real-Time Event Processing system 204, one or more Media Managers 206 and an SMPP (Short Message Peer-to-Peer) Transport 208, as well as modules for various SS7 protocols, such as MTP-1 (Message Transfer Part Level 1) 210, MTP-2 (Message Transfer Part Level 2) 212, MTP-3 (Message Transfer Part Level 3) 214, ISUP (Integrated Services Digital Network User Part) 216, SCCP (Signaling Connection Control Part) 218 and TCAP (Transactions Capabilities Application Part) 220 protocols.

The Call Processing system 200, Presence Server 202, Media Managers 204, SMPP Transport 206 and other modules communicate across an IP network 222. The Real-Time Event Processing system 204 communicates directly with the Call Processing system 200, Presence Server 202 and the modules for various SS7 protocols. The modules for various SS7 protocols communicate with other entities via a SS7 Signaling Link 224. The SMPP Transport 206 communicates with the SMSC (Short Message Service Center) gateway 126 using the SMPP protocol 226. The Media Managers 204 communicate among themselves using the H.110 protocol 228.

The operation of these various components are described in more detail below.

The originating handset 120 signals the RTX 102 via the wireless network 100, e.g., by transmitting one or more configured DTMF (Dual Tone Multi Frequency) digits to the RTX 102. The Media Manager systems 206 receive the DTMF digits and pass the DTMF digits to the Call Processing system 200. The Call Processing (CP) system 200 determines whether the originating handset 120 has subscribed to the AVS feature before originating the AVS call. Upon confirmation, the Call Processing system 200 initiates a new AVS call. The Call Processing system 200 interacts with the Presence Server 202 and Real-Time Event Processing system 204 to cause the wireless network 100 to perform call setup with the terminating handsets 120 for the AVS call and thereafter to manage the call.

During the AVS call, the Call Processing system 200 interacts with the Media Manager systems 206 to maintain the H.110 channels 227 and assign any additional H.110 channels 228 required for the call, which may span across multiple Media Manager systems 206. During the call, the Media Manager systems 206 of the RTX 102 are used to mix audio streams between the originating handsets 120 and the terminating handsets 120 and then deliver these mixed audio streams to the originating handsets 120 and the terminating handsets 120. The H.110 channels 228 are used for passing mixed and unmixed audio streams voice between the Media Manager systems 200 as required.

Handset Pre-Provisioning

Before the handsets. 120 and RTX 102 can interact to provide AVS sessions, the handsets 120 are pre-provisioned with a client application for the advanced voice services. Pre-provisioning the handsets 120 before the handsets 120 are delivered to customers reduces customer interaction during activation of the handsets 120 for use in the network 100 and also minimizes retail, business and customer service interaction with customers.

The client application is executed by the handset 120 when the handset 120 is turned on for the first time to provide the necessary functionality for the AVS sessions. The client application executed by the handset 120 transmits an AVS activation request to the RTX 102 and the RTX 102 activates the AVS features for the handset 120 in response to the activation request.

Two methods are used for pre-provisioning, depending upon whether the MS-ISDN number of the handset 120 is changed or not. In a first method, the handset's 120 number is not changed during activation, while in a second method, the handset's 120 number is changed during activation.

In the second method, wherein the handset's 120 number is changed by contacting a customer service representative to have the number changed, wherein the customer service representative invokes a function within the network 100 to change the number associated with the handset 120 to a new number and the RTX 102 transmits a "reconfiguration" message to the handset 120 after the handset 120 is powered on that causes the handset 120 to change its number to the new number.

No MS-ISDN Number Change

Figure 3:
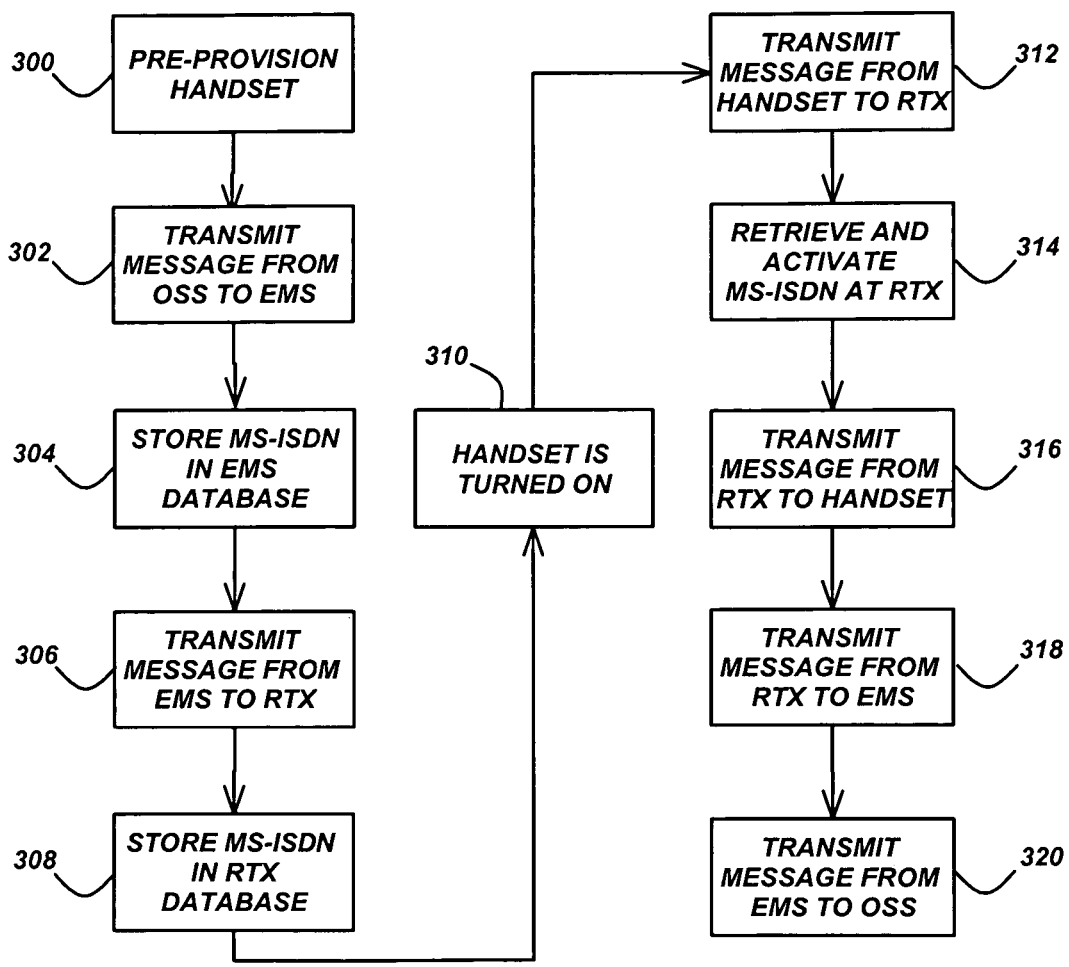
FIG. 3 is a flowchart that illustrates a "No MS-ISDN number Change" method of handset pre-provisioning according to the preferred embodiment of the present invention.

FIG. 3 is a flowchart that illustrates a "No MS-ISDN Number Change" method of handset 120 pre-provisioning according to the preferred embodiment of the present invention. This method reduces the total provisioning time experienced by the end user or subscriber after the initial point of sale of the handset 120.

Block 300 represents a handset 120 being pre-provisioned with a client application at some point in the manufacturing or distribution chain, e.g., at the factory, warehouse, distribution center, retail store, etc.

Block 302 represents the OSS 130 transmitting a "Provision Subscriber Request" message to the EMS 128, wherein the message identifies the handset 120 (by electronic serial number (ESN)) and associates the handset 120 with an MS-ISDN number.

Block 304 represents the EMS 128 receiving the message and performing a validation process, including storing the ESN and MS-ISDN number of the handset 120 in its database.

Block 306 represents the EMS 128, in turn, transmitting the "Provision Subscriber Request" message to a pre-determined RTX 102.

Block 308 represents the pre-determined RTX 102 receiving the message and performing a validation process, including storing the ESN and MS-ISDN number of the handset 120 in its database.

Block 310 represents the handset 120 being turned on by the subscriber for the first time, which causes the pre-provisioned client application stored in the handset 120 to load and begin executing.

Block 312 represents the client application in the handset 120 transmitting an "Activation Request" message to the pre-determined RTX 102 upon power-on.

Block 314 represents the pre-determined RTX 102 receiving the message, retrieving the MS-ISDN number from its database using the ESN of the handset 120 and indicating in its database that the handset 120 is now activated.

Block 316 represents the pre-determined RTX 102 transmitting an "Auto-Configuration" message to the handset 120 including the MS-ISDN number, wherein the message identifies the home RTX 102 for the handset 120.

Block 318 represents the pre-determined RTX 102 also transmitting the Activation Request message to the EMS 128, which also stores an indication that the handset 120 is now active.

Block 320 is an optional step that represents the EMS 128 transmitting the Activation Request to the OSS 130, as an activation reporting mechanism.

Since the handset 120 activation process is triggered by the initial power-on of the handset 120 by the subscriber, there is very high probability of success, as the system knows for sure that the handset 120 is powered-on. It is recommended that a "retry count" and "retry timer" in the auto-configuration be set to a sufficiently large number to increase the probability of success even further.

MS-ISDN Number Change

Figure 4:
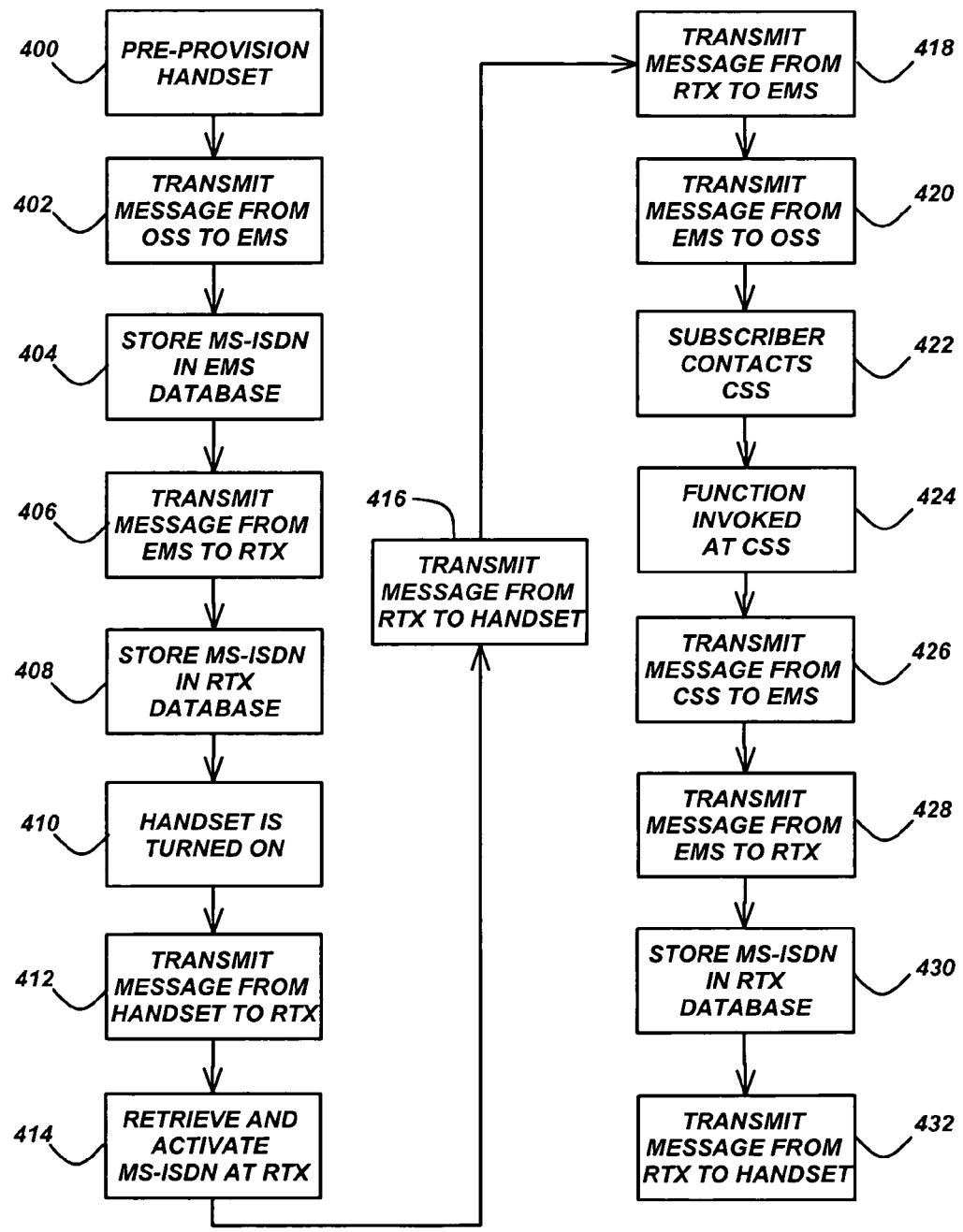
FIG. 4 is a flowchart that illustrates an "MS-ISDN number Change" method of handset pre-provisioning according to the preferred embodiment of the present invention.

FIG. 4 is a flowchart that illustrates an "MS-ISDN Number Change" method of handset 120 pre-provisioning according to the preferred embodiment of the present invention. This method allows a possible MS-ISDN number change after the point of sale. It is assumed that the subscriber calls a CSS 132 representative to have the MS-ISDN number changed. The CSS 132 representative can then initiate a function on the CSS 132 that modifies the MS-ISDN number associated with the subscriber's handset 120.

Block 400 represents a handset 120 being pre-provisioned with a client application at some point in the manufacturing or distribution chain, e.g., at the factory, warehouse, distribution center, retail store, etc.

Block 402 represents the OSS 130 transmitting a "Provision Subscriber Request" message to the EMS 128, wherein the message identifies the handset 120 (by electronic serial number (ESN)) and associates the handset 120 with an MS-ISDN number.

Block 404 represents the EMS 128 receiving the message and performing a validation process, including storing the ESN and MS-ISDN number of the handset 120 in its database.

Block 406 represents the EMS 128, in turn, transmitting the "Provision Subscriber Request" message to a pre-determined RTX 102.

Block 408 represents the pre-determined RTX 102 receiving the message and performing a validation process, including storing the ESN and MS-ISDN number of the handset 120 in its database.

Block 410 represents the handset 120 being turned on by the subscriber for the first time, which causes the pre-provisioned client application stored in the handset 120 to load and begin executing.

Block 412 represents the client application in the handset 120 transmitting an "Activation Request" message to the pre-determined RTX 102 upon power-on.

Block 414 represents the pre-determined RTX 102 receiving the message, retrieving the MS-ISDN number from its database using the ESN of the handset 120 and indicating in its database that the handset 120 is now activated.

Block 416 represents the pre-determined RTX 102 transmitting an "Auto-Configuration" message to the handset 120, wherein the message identifies the home RTX 102 for the handset 120.

Block 418 represents the pre-determined RTX 102 also transmitting the Activation Request message to the EMS 128, which also stores an indication that the handset 120 is now active.

Block 420 is an optional step that represents the EMS 128 transmitting the Activation Request to the OSS 130, as an activation reporting mechanism.

Block 422 represents the subscriber contacting a CSS 132 representative to request a change to the MS-ISDN number of its handset 120.

Block 424 represents the CSS 132 representative invoking a function at the CSS 132 to change the MS-ISDN number associated with the handset 120 to a new MS-ISDN number.

Block 426 represents the CSS 132 transmitting a "Modify MS-ISDN Request" message with the new MS-ISDN number to the EMS 128, wherein the message identifies the handset 120 (by its old MS-ISDN number or by its ESN) and associates the handset 120 with the new MS-ISDN number.

Block 428 represents the EMS 128 receiving the message, updating its database and then transmitting the "Modify MS-ISDN Request" message and the new MS-ISDN number to the pre-determined RTX 102.

Block 430 represents the pre-determined RTX 102 receiving the message and updating its database with the new MS-ISDN number of the handset 120 in its database.

Block 432 represents the pre-determined RTX 102 transmitting a "Reconfiguration" message to the handset 120, wherein the message causes the handset 120 to store its new MS-ISDN number.

In most situations, the subscriber has only one step to follow, i.e., turn the handset 120 on. Alternatively, the subscriber either keeps the handset 120 powered on or the handset 120 is reconfigured during next power-on process.

As the activation process is initiated by the subscriber turning on the handset 120, the activation process is estimated to take very short time. In addition, as the activation process is initiated by the subscriber turning on the handset 120, the activation process is very unlikely to fail.

Pre-Determined RTX

It is envisioned that every country, network, region, or other designated area, will assign a pre-determined RTX 102 the task of performing the activation process described above. The purpose of the pre-determined RTX 102 is to accept the auto-configuration request and determine the home RTX 102 of the subscriber based on a network 100 map stored in the RTX 102.

The following two methods can be used to do pre-provisioning for pre-determined RTX 102:

1. As part of pre-provisioning process, every handset 120 is sent an auto-configuration message with the address of the pre-determined RTX 102. An option in the EMS 128 can be provided to push auto-configuration messages to handsets 120 on a "on demand" basis.

2. The client application loaded into the handset 120 may be pre-programmed with the address of the pre-determined RTX 102. This is a less desirable approach as it may require different versions of the client application.

SMSC (Short Message Service Center) Bypass (SB)

In the preferred embodiment, presence messages are exchanged between the handsets 120 and the Presence Server 202 of the RTX 102 using a Short Message Service (SMS) between the RTX 102 and the MSC 104. This is in contrast to prior implementations where the RTX 102 communicated with handsets 120 or other RTXs 102 using the SMPP Transport 208 to the SMSC gateway 126.

A SMSC (Short Message Service Center) Bypass (SB) feature uses a MAP (Mobile Application Part) interface over an SS7 link 224 to connect the Presence Server 202 of the RTX 102 directly to the MSC 104. This means that the presence messages are exchanged between the handsets 120 and the Presence Server 202 of the RTX 102 using the SMS without having to transmit the messages through the SMSC gateway 126.

The MAP interface is typically used to connect distributed MSCs 104 with the HLR 124, which dynamically stores the current location and profile of a handset 120 and subscriber. The HLR 124 is consulted during the processing of an incoming call and is updated as the handset 120 moves about the network 100 and is thus serviced by different MSCs 104 within the network 104.

Using the SB with the RTX 102 enables all messages used for the Presence Management protocol between the handset 120 and the RTX 102 to use the MAP Forward Short Message (Fwdsm) and other MAP procedures. The full MAP functionality is needed to deliver the SMS to the MSC 104 and the SB implements associated procedures.

The purpose of the SB is to provide a universal standardized interface, to safeguard the RTX 102 from proprietary SMSC gateway 126 solutions and protocols, to eliminate latency introduced by the SMSC gateway 126 store-and-forward mechanism and to provide a more efficient and independent approach to performing presence management.

Figure 5:
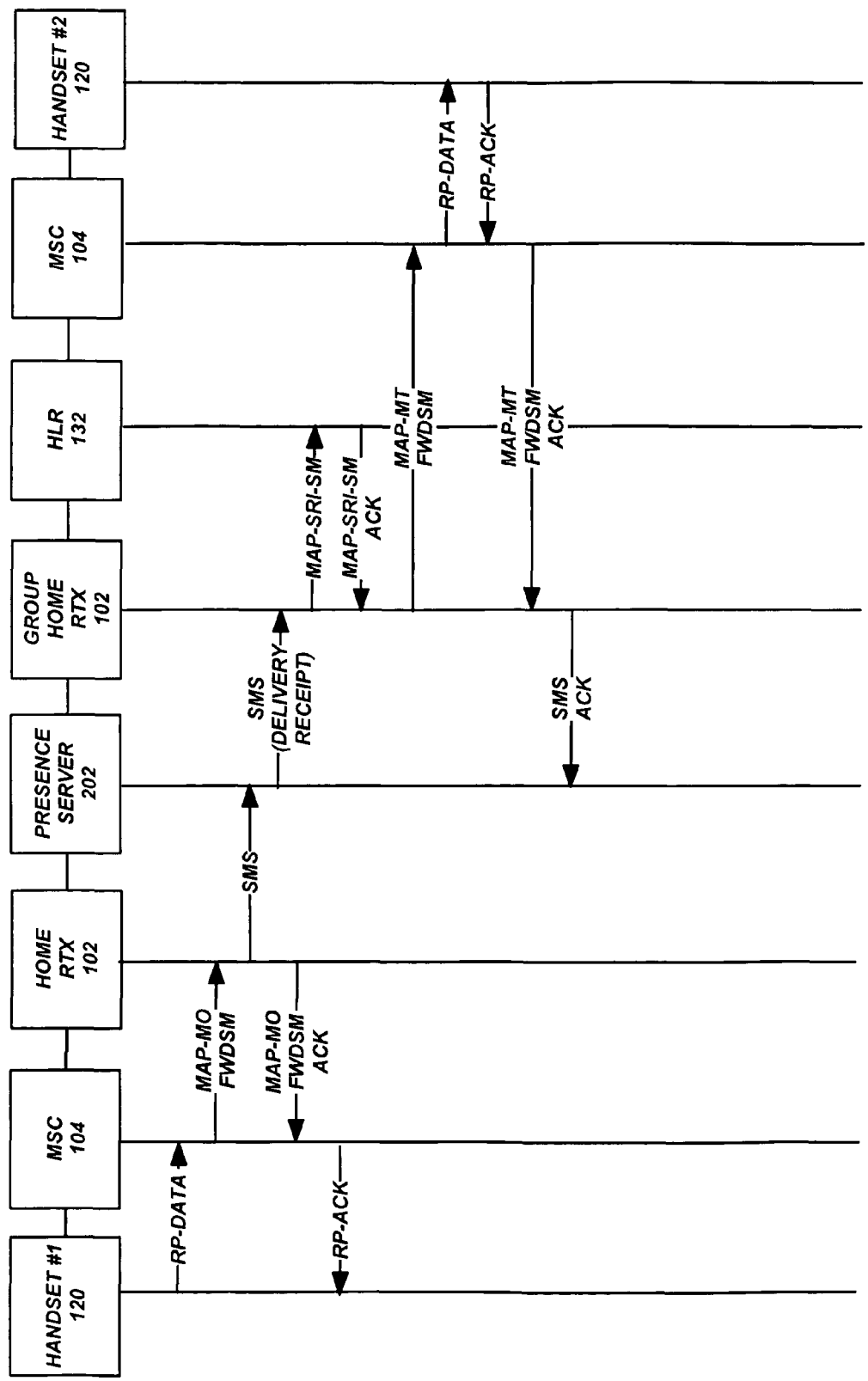
FIG. 5 is a diagram that illustrates the call flow for SMSC (Short Message Service Center) Bypass (SB) according to a preferred embodiment of the present invention.

FIG. 5 is a diagram that illustrates the call flow for SB according to a preferred embodiment of the present invention. This call flow explains the set of messages exchanged between the SB and the network 100.

1. The first or originating handset 120 (identified in the figure as handset #1) transmits an RP-DATA message to the MSC 104.
2. The MSC 104 transmits a MAP-MO-Fwdsm message to the home RTX 102 of the handset 120.
3. The home RTX 102 translates the MAP-MO-Fwdsm message into an SMS message for the Presence Server 202.
4. The Presence Server transmits the SMS message to the group home RTX 102. (Note that the home RTX 102 and group home RTX 102 may be the same RTX.)
5. The RTX 102 transmits a MAP-MO-Fwdsm-Ack message to the MSC 104.
6. The MSC 104 transmits an RP-ACK message to the first or originating handset 120.
7. The group home RTX 102 transmits a MAP-SRI-SM message to the HLR 124.
8. The HLR 124 responds with a MAP-SRI-SM-Ack message to the group home RTX 102.
9. The group home RTX 102 sends a MAP-MT-Fwdsm message to the MSC 104 of the second or terminating handset 120 (identified in the figure as handset #2).
10. The MSC 104 for the terminating handset 120 transmits an RP-DATA message to the terminating handset 120.
11. The terminating handset 120 responds to the MSC 104 with an RP-Ack message.
12. The MSC 104 for the terminating handset 120 transmits an MAP-MT-Fwdsm-Ack message to the group home RTX 102.
13. The group home RTX 102 transmits an SMS Ack to the Presence Server 202.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for providing advanced voice services in a wireless network, comprising:
    a wireless network for making calls between handsets, wherein the calls are initiated by call setup and in-band signaling within the wireless network and voice frames for the calls are switched between the handsets by at least one mobile switching center across bearer paths in the wireless network; and
    a real-time exchange that interfaces to at least one mobile switching center in the wireless network to provide advanced voice services therein, without requiring any changes to the mobile switching center or other equipment of the wireless network to provide the advanced voice services;
    wherein both the real-time exchange and the handsets that use the advanced voice services communicate with each other using the call setup and in-band signaling within the wireless network, such that at least one mobile switching center routes an originating leg of the advanced voice services from an originating mobile to the real-time exchange, the real-time exchange initiates one or more terminating legs of the advanced voice services to one or more terminating mobiles through at least one mobile switching center, and the real-time exchange switches the voice frames for the advanced voice services from the originating handset to the terminating handsets across the bearer paths and through at least one mobile switching center that switches the voice frames for both the calls and the advanced voice services in the wireless network;
    wherein the handsets are pre-provisioned for the advanced voice services before being delivered to a customer in order to reduce customer interaction during activation of the handsets for use in the network;
    wherein the handset's number is changed during activation by contacting a customer service representative to have the number changed; and
    wherein the customer service representative invokes a function within the network to change the number associated with the handset to a new number and the real-time exchange transmits a "reconfiguration" message to the handset that causes the handset to change its number to the new number.

2. The apparatus of claim 1, wherein the advanced voice services comprise Push-to-Talk (P2T), Push-to-Conference (P2C), Upgrade to Conference, Push-to-Message (P2M) or Group SMS (Short Message Service).

3. The apparatus of claim 1, wherein the handsets are pre-provisioned with a client application.

4. The apparatus of claim 3, wherein the client application executes when the handset is turned on for the first time.

5. The apparatus of claim 4, wherein the client application transmits an advanced voice services activation request to the real-time exchange.

6. The apparatus of claim 5, wherein the real-time exchange activates the advanced voice services for the handset in response to the activation request.

7. The apparatus of claim 1, wherein the handset's number is changed after the handset is powered on.

8. A method of providing advanced voice services in a wireless network, comprising:
    making calls between handsets in a wireless network, wherein the calls are initiated by call setup and in-band signaling within the wireless network and voice frames for the calls are switched between the handsets by at least one mobile switching center across bearer paths in the wireless network; and
    providing advanced voice services in the wireless network using a real-time exchange that interfaces to at least one mobile switching center in the wireless network, without requiring any changes to the mobile switching center or other equipment of the wireless network to provide the advanced voice services;

wherein both the real-time exchange and the handsets that use the advanced voice services communicate with each other using the call setup and in-band signaling within the wireless network, such that at least one mobile switching center routes an originating leg of the advanced voice services from an originating mobile to the real-time exchange, the real-time exchange initiates one or more terminating legs of the advanced voice services to one or more terminating mobiles through at least one mobile switching center, and the real-time exchange switches the voice frames for the advanced voice services from the originating handset to the terminating handsets across the bearer paths and through at least one mobile switching center that switches the voice frames for both the calls and the advanced voice services in the wireless network;

wherein the handsets are pre-provisioned for the advanced voice services before being delivered to a customer in order to reduce customer interaction during activation of the handsets for use in the network;

wherein the handset's number is changed during activation by contacting a customer service representative to have the number changed; and wherein the customer service representative invokes a function within the network to change the number associated with the handset to a new number and the real-time exchange transmits a "reconfiguration" message to the handset that causes the handset to change its number to the new number.

9. The method of claim 8, wherein the advanced voice services comprise Push-to-Talk (P2T), Push-to-Conference (P2C), Upgrade to Conference, Push-to-Message (P2M) or Group SMS (Short Message Service).

10. The method of claim 8, wherein the handsets are pre-provisioned with a client application.

11. The method of claim 10, wherein the client application executes when the handset is turned on for the first time.

12. The method of claim 11, wherein the client application transmits an advanced voice services activation request to the real-time exchange.

13. The method of claim 12, wherein the real-time exchange activates the advanced voice services for the handset in response to the activation request.

14. The method of claim 8, wherein the handset's number is changed after the handset is powered on.

* * * * *